(12) United States Patent
Singleton et al.

(10) Patent No.: US 8,332,500 B1
(45) Date of Patent: Dec. 11, 2012

(54) TRANSMITTING DATA REQUESTS BASED ON USAGE CHARACTERISTICS OF APPLICATIONS

(75) Inventors: David Singleton, London (GB); Scott Eblen, London (GB); Adam Connors, Berkhamstead (GB)

(73) Assignee: Google Inc., Mountain View, CA (US)

( * ) Notice: Subject to any disclaimer, the term of this patent is extended or adjusted under 35 U.S.C. 154(b) by 254 days.

(21) Appl. No.: 12/697,007

(22) Filed: Jan. 29, 2010

(51) Int. Cl.
*G06F 15/173* (2006.01)

(52) U.S. Cl. ........ 709/223; 709/203; 709/217; 709/219; 709/224

(58) Field of Classification Search .................. 709/223, 709/224, 203, 217, 219
See application file for complete search history.

(56) References Cited

U.S. PATENT DOCUMENTS

| | | | | |
|---|---|---|---|---|
| 5,958,010 | A * | 9/1999 | Agarwal et al. | 709/224 |
| 7,356,590 | B2 * | 4/2008 | Wilson et al. | 709/224 |
| 7,486,930 | B2 | 2/2009 | Bisdikian et al. | |
| 2006/0023642 | A1 * | 2/2006 | Roskowski et al. | 370/254 |
| 2007/0016672 | A1 * | 1/2007 | Wilson et al. | 709/224 |
| 2007/0083611 | A1 * | 4/2007 | Farago et al. | 709/217 |
| 2008/0109317 | A1 * | 5/2008 | Singh | 705/14 |
| 2008/0195691 | A1 * | 8/2008 | Kloba et al. | 709/201 |
| 2008/0200161 | A1 * | 8/2008 | Morse et al. | 455/418 |
| 2009/0036102 | A1 | 2/2009 | Ho | |
| 2009/0055523 | A1 * | 2/2009 | Song et al. | 709/224 |
| 2009/0234529 | A1 | 9/2009 | Sampedro Diaz et al. | |
| 2011/0010445 | A1 * | 1/2011 | Das et al. | 709/224 |
| 2011/0225252 | A1 * | 9/2011 | Bhat et al. | 709/206 |
| 2011/0264663 | A1 * | 10/2011 | Verkasalo | 707/740 |
| 2012/0117006 | A1 * | 5/2012 | Sathish | 706/12 |

OTHER PUBLICATIONS

Singleton, David, "Synchronisation Compression," Computer Science Tripos, St. John's College, May 3, 2002 (65 Pgs.).
Agronomic Crops Team "Agronomic Crops Network, Handheld Devices" Http://agnr.osu.edu, Ohio State University, 2003 (2 Pgs.).

* cited by examiner

*Primary Examiner* — Lashonda Jacobs
(74) *Attorney, Agent, or Firm* — Shumaker & Sieffert, P.A.

(57) ABSTRACT

In general, this disclosure describes example techniques to transmit a request for data for one or more applications based on usage patterns of the one or more applications by a user. A device such as, but not limited to, a mobile device may monitor usage characteristics of the one or more applications. The device may transmit a request for data used by the one or more applications executed on the device based on the monitored usage characteristics.

20 Claims, 9 Drawing Sheets

| APPLICATION | APPLICATION USAGE CHARACTERISTICS | CONTEXTUAL USAGE CHARACTERISTICS |
|---|---|---|
| APPLICATION 28A | USER 22 REQUESTED STOCK QUOTES FOR GOOGLE | MONDAY, 8:00 AM, LOCATION 1 |
| | USER 22 REQUESTED STOCK QUOTES FOR GOOGLE | TUESDAY, 8:05 AM, LOCATION 1 |
| | USER 22 REQUESTED STOCK QUOTES FOR GOOGLE | WEDNESDAY, 8:02 AM, LOCATION 1 |
| APPLICATION 28B | USER 22 REQUESTED RESTAURANT INFORMATION | LOCATION 2, NOT MOVING |
| | USER 22 REQUESTED RESTAURANT INFORMATION | LOCATION 2, NOT MOVING |
| | USER 22 REQUESTED RESTAURANT INFORMATION | LOCATION 2, NOT MOVING |

FIG. 4A

| TREND DATA |
|---|
| MONDAY-WEDNESDAY AT 8:00, AT LOCATION 1, APPLICATION 28A, GOOGLE STOCK QUOTES |
| AT LOCATION 1, NOT MOVING, APPLICATION 28B, RESTAURANT INFORMATION |

TRANSMITTING DATA REQUESTS BASED ON USAGE CHARACTERISTICS OF APPLICATIONS

TECHNICAL FIELD

This disclosure is related to transmitting application data requests from a device to one or more servers external to the device.

BACKGROUND

Some devices provide the benefit of being portable while allowing a user to perform functions previously reserved for desktop computers. Some mobile devices are capable of accessing the Internet, executing gaming applications, playing videos and music, as well as providing functionality of a traditional cellular phone. For example, a mobile device may provide a user of the mobile device a Web browser where the user can input a Web address for a website and download content from the website for presentment on the mobile device.

SUMMARY

In one example, aspects of this disclosure are directed to a computer-readable storage medium comprising instructions that when executed cause one or more processors to monitor application and contextual usage characteristics of one or more applications executed on a device, wherein the application usage characteristics identify a manner in which a user utilized each of the one or more applications, and wherein the contextual usage characteristics identify a context in which the user utilized each of the one or more applications, and transmit, to one or more servers external to the device, a request for data to be used by the one or more applications based on the monitored application and contextual usage characteristics, wherein transmitting the request is initiated by the device without user intervention.

In one example, aspects of this disclosure are directed to a method comprising monitoring, by at least one of a device or one or more servers external to the device, application and contextual usage characteristics of one or more applications executed on the device, wherein the application usage characteristics identify a manner in which a user utilized each of the one or more applications, and wherein the contextual usage characteristics identify a context in which the user utilized each of the one or more applications, and transmitting, by the device, to the one or more servers external to the device, a request for data to be used by the one or more applications based on the monitored application and contextual usage characteristics, wherein transmitting the request is initiated by the device without user intervention.

In one example, aspects of this disclosure are directed to a device comprising one or more processors configured to execute one or more applications on the device and to monitor application and contextual usage characteristics of one or more applications, wherein the application usage characteristics identify a manner in which a user utilized each of the one or more applications, and wherein the contextual usage characteristics identify a context in which the user utilized each of the one or more applications, and means for transmitting, to one or more servers external to the device, a request for data to be used by the one or more applications based on the monitored application and contextual usage characteristics, wherein transmitting the request is initiated by the device without user intervention.

In one example, aspects of this disclosure are directed to a system comprising one or more servers, wherein at least one of the one or more servers is configured to identify application and contextual usage characteristics of one or more applications executed on one or more devices, wherein the application usage characteristics identify a manner in which a user utilized each of the one or more applications, and wherein the contextual usage characteristics identify a context in which the user utilized each of the one or more applications. The at least one of the one or more servers further configured to compile trend data for each device of the one or more devices based on the trend data without having received a request from the one or more devices for the data.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a diagram illustrating an example of an application usage model, in accordance with one aspect.

FIG. 4B is a diagram illustrating an example of trend data, in accordance with one aspect.

DETAILED DESCRIPTION

Aspects of this disclosure describe techniques that may monitor the manner and context in which a user utilizes an application executed on a device. The manner in which a user utilizes an application may indicate, for example, that the user utilized an application to retrieve stock quotes for three particular companies. The context in which the user utilizes the application may indicate, for example, the time when the user utilized the application to retrieve stock quotes for the three particular companies.

Techniques of this disclosure may identify user behavioral patterns based on the manner and context in which the user utilizes the application. Based on the behavioral patterns, the device may transmit a request for data to be used by the application. In some non-limiting examples, the device may transmit the request for data prior to when the pattern indicates the user utilizes the data of the application.

Figure 1:
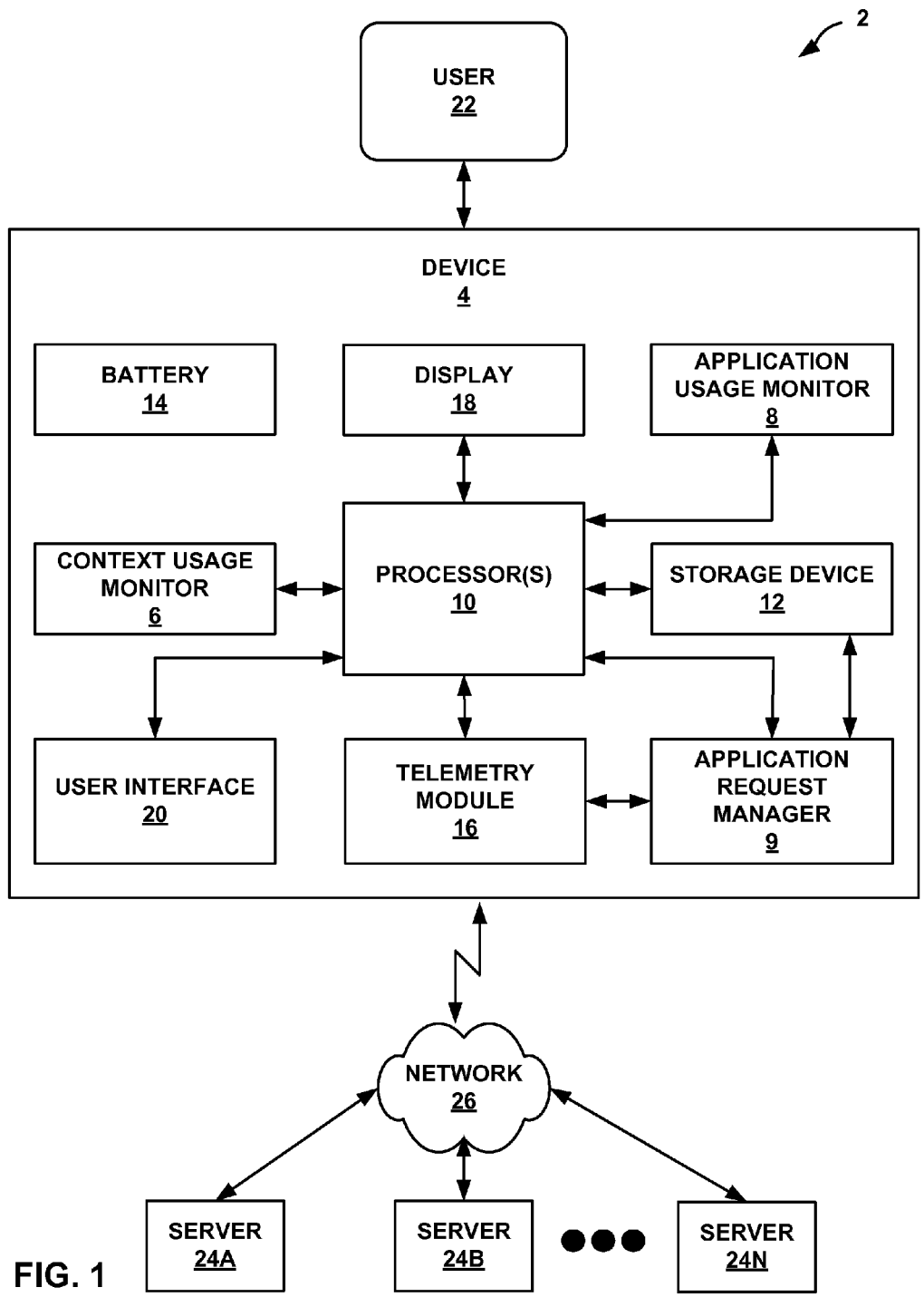
FIG. 1 is a block diagram illustrating an example communication system that may allow transmission of request for data for one or more applications from a device to one or more servers, in accordance with one aspect.

FIG. 1 is a block diagram illustrating an example communication system that may allow transmission of request for data for one or more applications from a device to one or more servers, in accordance with one aspect. As shown in FIG. 1, communication system 2 includes device 4, one or more servers 24A-24N ("servers 24"), and network 26. Examples of device 4 include, but are not limited to, portable or mobile devices such as cellular phones, personal digital assistants (PDAs), laptop computers, portable gaming devices, portable media players, e-book readers, watches, as well as non-portable devices such as desktop computers. For purposes of illustration only in this disclosure, device 4 is described as a portable or mobile device that a user can carry, but aspects of this disclosure should not be considered limited to portable or mobile devices.

Device 4 and servers 24 are coupled to network 26 via wired and/or wireless links. Device 4 may send data to or receive data from servers 24 via network 26. Network 26 may include a wide-area network such as the Internet, a local-area network (LAN), an enterprise network, or one or more other types of networks. Servers 24 may be any of several different types of network devices. For instance, servers 24 may be conventional web servers, specialized media servers, personal computers operating in a peer-to-peer fashion, or other types of network devices.

Device 4 may include context usage monitor 6, application usage monitor 8, application request manager 9, processor 10, storage device 12, battery 14, telemetry module 16, display 18, and user interface 20. In examples where device 4 is a cellular phone, device 4 includes a microphone and speaker (not shown) for voice communication. User interface 20 allows a user of device 4, e.g., user 22, to interact with device 4. Examples of user interface 20 include a keypad embedded on device 4, a keyboard, a mouse, a roller ball, buttons, or other devices that allow user 22 to interact with device 4. In some examples, user interface 20 may include a microphone to allow user 22 to provide voice commands.

Display 18 may be a liquid crystal display (LCD), e-ink, or other display. Display 18 presents the content of device 4 to user 22. For example, display 18 may present the applications executed on device 4 such as a web browser or a video game, content retrieved from servers 24, and other functions that may need to be presented to user 22. In some examples, display 18 may provide some or all of the functionality of user interface 20. For example, display 18 may be a touch screen that allows user 22 to interact with device 4.

Although device 4 is shown as including display 18, aspects of this disclosure should not be considered limited to examples that include display 18. In some examples of device 4, display 18 may be optional. For example, if device 4 comprises a music player or a radio, device 4 may not include a display 18.

Storage device 12 stores instructions for applications that may be executed by one or more processors 10. For purposes of illustration only in the following description, the applications that may be executed by one or more processors 10 are described below as being executed by one processor 10. The applications may be downloaded by user 22 via network 26 (e.g., from one or more of servers 24) or may be preprogrammed within device 4. The applications may be executed by processor 10 in response to user 22 interacting with device 4 to execute the applications. The applications may also be executed by processor 10 when user 22 turns on device 4.

In some examples, user 22 or device 4 may terminate execution of the applications. In some other examples, user 22 or device 4 may allow the applications to continuously run in the background. Examples of applications include a web browser, e-mail, a program to retrieve stock quotes, a program to search for restaurants, a program that provides current and future weather conditions, games, a program to search the Internet, a program that provides news, a program that provides maps, and other applications that are executed by processor 10. As one example, a web browser may be an application that user 22 executes and then terminates after user 22 is done viewing a website. As one example, e-mail may be an application that user 22 executes and then allows the e-mail program to run continuously in the background until user 22 turns off device 4.

Storage device 12 may also include instructions that cause processor 10 to perform various functions ascribed to processor 10 in this disclosure. Storage device 12 may be a computer-readable, machine-readable, or processor-readable storage medium that comprises instructions that cause one or more processors, e.g., processor 10, to perform various functions. Storage device 12 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

User 22 may interact with user interface 20 and/or display 18 to execute one or more of the applications stored on storage device 12. Some applications may be executed automatically by device 4 such as when device 4 is turned on or booted up. In response, processor 10 executes the one or more applications selected by user 22, or executes the one or more applications executed by device 4. Processor 10 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to processor 10, in this disclosure, may be embodied as software, firmware, hardware or any combination thereof.

In some examples, any application executed by processor 10 may require data from one or more of servers 24. As described in more detail below, application request manager 9 may determine whether the request for data should be transmitted. If the request for data should be transmitted, application request manager 9 causes telemetry module 16 to transmit a request for the data and receive the data from one or more of servers 24. Telemetry module 16 may provide the received data to processor 10 for further processing. Telemetry module 16 is configured to transmit data/requests to and receive data/responses from one or more servers 24 via network 24. Telemetry module 16 may support wireless or wired communication, and includes appropriate hardware and software to provide wireless or wired communication. For example, telemetry module 16 may include an antenna, modulators, demodulators, amplifiers, and other circuitry to effectuate communication between device 4 and one or more of servers 24.

As one example, storage device 12 may store application instructions associated with the Google Chrome web browser. User 22 may interact with user interface 20 and/or display 18 to execute the web browser. Processor 10 then executes the web browser application and causes display 18 to display a web browser to user 22. User 22 may then interact with user interface 20 and/or display 18 to enter a website, such as http://www.google.com, into the displayed web browser. In this example, application request manager 9 causes telemetry module 16 to transmit a request to one or more of servers 24, via network 24, for the requested website. Display 18 then presents the received website content to user 22.

Application usage monitor 8 may monitor the manner in which user 22 utilizes each one of the applications executed by processor 10. The manner in which user 22 utilizes each one of the executed applications may be referred to as the application usage characteristics. For example, processor 10 may execute a web browser application that accesses a website based on a uniform resource locator (URL) entered by user 22. The requested website content could provide information for local restaurants. The local restaurants may be based on an entry by user 22 of the zip code. As another example, processor 10 may execute a restaurant locator application that could provide information for local restaurants. In these examples, application usage monitor 8 may monitor that user 22 requested information for local restaurants, and the application usage characteristic may therefore specify that user 22 requested information for local restaurants.

As another example, processor 10 may execute an application that retrieves stock information as particularly requested by user 22. In this example, application usage monitor 8 may monitor that user 22 requested information for particular stocks, and the application usage characteristics may therefore indicate that user 22 requested information for these particular stocks. Application usage monitor 8 may similarly monitor application usage characteristics for each application executed by processor 10.

Functions attributed to application usage monitor 8 in this disclosure may be embodied as software, firmware, hardware or any combination thereof. Moreover, although shown as separate units in FIG. 1, in some examples, processor 10 may include application usage monitor 8.

Context usage monitor 6 may monitor the context in which user 22 utilized each one of the applications executed by processor 10. The context in which user 22 utilized each one of the executed applications may be referred to as the contextual usage characteristics. Examples of the contextual usage characteristics include temporal data, motion data, location data, and the mode of operation of device 4. Examples of temporal data include, for example, date, day of month, day of week, and time of day. In some examples, the temporal data may also include the status of user 22. For example, user 22 may program a calendar provided by device 4 to indicate times when user 22 is free or busy. The temporal data may also include times when user 22 is free or busy, as one example. Motion data may refer to the motion of device 4. In examples where user 22 carries device 4, the motion of device 4 may indicate the motion of device 4 when user 22 is, for instance, walking, running, or standing still. Location data may indicate the physical location of device 4 such as locations provided by a global positioning system (GPS). In some examples, the location data may be provided to recognize when device 4 is in a familiar location, and if not in a familiar location, may consider the location to be unfamiliar. The location may be identified as familiar if device 4 had previously been used in that location, or if user 22 designated a location as familiar, as two non-limiting examples.

In examples where user 22 carries device 4, the location of device 4 may indicate the location of user 22. The mode of operation of device 4 may indicate operation modes of device 4, such as when device 4 loses connectivity, loses a particular type of connectivity (e.g., Wi-Fi connectivity, enhanced data for global evolution (EDGE) connectivity, or 3G connectivity), or changes the type of connectivity (e.g., changes from Wi-Fi to EDGE, Wi-Fi to 3G, or any combination thereof). In some examples, the operation modes of device 4 may include an indication that an alarm is set on device 4, or an indication that device 4 switched to sleep mode, turned off display 18, or reduced the brightness of display 18 to conserve power.

Contextual usage monitor 6 may also include an accelerometer and a clock. Additionally, the functions attributed to contextual usage monitor 6, in this disclosure, may be embodied as software, firmware, hardware or any combination thereof. Moreover, although shown as separate units in FIG. 1, in some examples, processor 10 may include context usage monitor 6.

Upon execution of an application, application usage monitor 8 may monitor the application usage characteristics of the application. Processor 10 may receive the application usage characteristics from application usage monitor 8 and receive, from context usage monitor 6, the contextual usage characteristics of when the application is executed.

For example, processor 10 may execute a web browser application and user 22 may view a particular web log(blog). In this example, application usage monitor 8 may monitor the application usage characteristics indicating that user 22 viewed a particular blog. In addition, processor 10 retrieves contextual usage characteristics from context usage monitor 6 that indicates the context in which user 22 viewed the particular blog. For example, processor 10 retrieves information about the time of day and day of week when user 22 viewed the particular blog and the location of user 22 when user 22 viewed the particular blog, for example, from GPS information. Application usage monitor 8, context usage monitor 6, and processor 10 may perform similar functions for every application executed by processor 10.

In some examples, processor 10 may associate the application usage characteristic of an executed application with the contextual usage characteristic when the application is executed. In these examples, processor 10 generates an application usage model based on the association of the application usage characteristic and the contextual usage characteristic. In some examples, processor 10 stores the application usage model in storage device 12. Processor 10 may store the application usage model in non-volatile portions of storage device 12.

In some examples, processor 10 may generate trend data for each application based on its application usage model. The trend data may be based on a single or multiple executions of each application. The trend data may represent a pattern of the manner in which user 22 utilized each one of the one or more applications and a pattern of the context in which the user utilized each one of the one or more applications. The trend data may be continually updated or refined over time as user 22 utilizes the one or more applications. For example, user 22 may access information for local restaurants within a five-mile radius every Friday at 7:00 pm. For each instance that user 22 accessed information for local restaurants within a five-mile radius at 7:00 pm on Friday, processor 10 may associate the contextual usage characteristic (e.g., a five-mile radius and Friday at 7:00 pm) with the application usage characteristic (e.g., user 22 executes an application that provides information for local restaurants). The association of the application usage characteristics and the contextual usage characteristics for every instance where user 22 requested the information for local restaurants may be stored in an application usage model in, e.g., non-volatile portions of storage device 12.

In one non-limiting example, processor 10 may analyze the application usage model to identify patterns of behavior of user 22. Based on the identified patterns, processor 10 may generate the trend data. In the previous example, upon analysis, processor 10 may generate the trend data indicates that user 22 requests for information for local restaurants within a five-mile radius at 7:00 pm every Friday. The trend of 7:00 pm every Friday may be based on slightly different times. For example, one Friday, user 22 may have requested the data at 7:01 pm, another Friday at 7:05 pm, and another Friday at 7:02 pm. In some instances, the trend data may indicate the earliest of the times from the pattern.

In some examples, the trend data may not be based on slightly different times. In some instances, the trend data may be based on greater variations in times. The trend data may indicate a running average of the instances when user 22 requested the particular information. For example, user 22 may make one request for information about local restaurants (e.g., local with respect to the location of device 4) one Friday at 6:00 pm, make another request for such information on a different Friday at 6:30 pm, make another request on a different Friday at 7:00 pm, make another request on a different Friday at 7:30 pm, and make another request on a different Friday at 8:00 pm. In one instance, where the trend data indicates a running average, the trend data may indicate that user 22 requests for information for local restaurants every Friday at 7:00 pm (e.g., the average of 6:00, 6:30, 7:00, 7:30, and 8:00 pm). In another instance, where the trend data indicates the earliest instance from the pattern, the trend data may indicate that user 22 requests for information for local restaurants every Friday at 6:00 pm. Other examples of generating trend data may be possible, and aspects of this disclosure should not be considered to the examples provided for generating trend data.

As another example, user 22 may access particular stock quotes every day except Sunday while waiting and/or not moving at a particular location. For each instance that user 22 accessed information for the particular stocks, processor 10 may associate the contextual usage characteristics, e.g., not moving and the particular location of device 4, with the application usage characteristics, e.g., user 22 executes an application that provides stock quotes for particular stocks. The association of the application usage characteristics and the contextual usage characteristics for every instance where user 22 requested the stock quotes for particular stocks may be stored as an application usage model in non-volatile portions of storage device 12.

As another example, user 22 may access the news every day after going for a jog. For each instance that user 22 accessed the news, processor 10 may associate the contextual usage characteristics, e.g., after user 22 stopped jogging, with the application usage characteristics, e.g., user 22 executes an application to access the news. The association of the application usage characteristics and the contextual usage characteristics for every instance where user 22 accessed the news may be stored as an application usage model in non-volatile portions of storage device 12.

Processor 10 may analyze the application usage model to identify patterns of behavior of user 22. Based on the identified patterns, processor 10 may generate the trend data. For example, upon analysis, processor 10 may generate the trend data that indicates that user 22 requests for stock quotes for particular stocks every day except of Sunday while at a particular location. As another example, upon analysis, processor 10 may generate trend data that indicates that user 22 requests for the news after jogging, and does not request for the news while jogging.

In some examples, rather than processor 10 generating the trend data, one of servers 24 may generate the trend data. For example, one of servers 24. e.g., server 24C, may be dedicated to generating trend data. Server 24C may generate the trend data for each device and provide the trend data to each device based on each device's unique identifier such as a serial number of the device, or some other identifier that uniquely identifies each device. The unique identifier may ensure the privacy of user 22 or other users.

In some instances, upon each execution of the applications, processor 10 may transmit the association between the application usage characteristics monitored by application usage monitor 8 and the contextual usage characteristics monitored by context usage monitor 6 to a server (e.g., server 24C). In these instances, processor 10 may not generate the application usage model, and server 24C may generate the application usage model based on the association between the monitored application usage characteristics and the monitored contextual usage characteristics. In some instances, processor 10 may wait until the applications have been executed a minimum number of times, generate the application usage model for the applications that are executed, and transmit the application usage model, after the applications have been executed a minimum number of times, to server 24C via telemetry module 16. In some examples, the number of times an application is executed before processor 10 transmits the application usage model may be five, but other possibly values are also contemplated by this disclosure.

In some examples, where one of servers 24 generates the trend data, e.g., server 24C, server 24C may generate the trend data without the application usage characteristics and the contextual usage characteristics. For example, server 24C may receive a request for data from device 4, as well as its unique identifier. For each instance of the request for data, server 24C may store the request for data, and identify a time when user 22 requested the data. In this manner, server 24C may monitor application usage characteristics based on the requested data, and may also monitor contextual usage characteristics based on the time when user 22 requested data, e.g., the time of day or day of week.

Server 24C may associate the monitored contextual usage characteristics and the application usage characteristics. Server 24C may associate the monitored contextual usage characteristics and the monitored application usage characteristics for each instance that user 22 requested data for a particular application. Based on the associated monitored contextual usage characteristics and the monitored application usage characteristics, server 24C may generate an application usage model and store the application usage model in a storage device of server 24C.

In some examples, where one of servers 24 generates the trend data, e.g., server 24C, processor 10 may transmit the contextual usage characteristics, and not transmit the application usage characteristics during the request for data. Server 24C may receive the request for data and monitor the application usage characteristics. Server 24C may also receive the monitored contextual usage characteristics, monitored by contextual usage monitor 6 of device 4. By receiving the monitored contextual usage characteristics, server 24C may be able to receive contextual characteristics such as location of user 22, motion of user 22, and the mode of operation of device 4, as well as, the temporal information. Server 24C may then associate the monitored application usage characteristics and the monitored contextual usage characteristics for each instance that user 22 request data for a particular location. Based on the associated monitored contextual usage characteristics and monitored application usage characteristics, server 24C may generate an application usage model and store the application usage mode in the storage of server 24C.

In the above examples, server 24C may then generate the trend data based on the application usage model, and transmit the trend data back to device 4. For example, server 24C may receive the associated application and contextual usage characteristics and identify patterns of behavior of user 22. Server 24C may receive the associated application usage characteristics and the contextual usage characteristics from device 4 and other devices similar to device 4. Server 24C may identify patterns of behavior for user 22, as well as users of other devices similar to device 4 that use their respective devices in a similar manner as user 22 uses device 4. Server 24C may identify patterns of behavior in a manner substantially similar to the manner in which processor 10 identifies patterns of behavior of user 22. However, server 24C may identify patterns of behavior in a manner that is different to the manner in which processor 10 identifies patterns of behavior of user 22.

In either instance, based on the identified patterns of behavior, server 24C may generate trend data for user 22 of device 4, as well as users of devices similar to device 4. Server 24C may associate the generated trend data for a user with the unique identifier that server 24C received from the devices. Server 24C may transmit the generated trend data to device 4 and other devices similar to device 4. In one example, to ensure that each device receives its appropriate trend data, server 24C may determine which device should receive which trend data based on the association of the unique identifier that server 24C received from each of the devices and the generated trend data.

In examples where one of servers 24, e.g., server 24C, generates the trend data, the trend data may be generated over longer periods of time compared to when device 4 generates the trend data. However, this need not be the case in every example. Storage device 12 of device 4 may be limited in its memory storage capabilities due to its size, and accordingly, may be limited in storing application usage models that are generated over a long period of time. Servers 24 may include much larger storage capabilities compared to storage device 12, and the application usage models may be much larger in size, e.g., may include monitored application usage characteristics and contextual usage characteristics for more instances compared to storage device 12. The trend data generated by one of servers 24 may indicate a pattern of behavior of user 22 that includes pattern information for over a year, and may indicate changes in the behavior of user 22 on a year-to-year basis.

In either example, where processor 10 generates the trend data or where one of servers 24 generates the trend data, application request manager 9 may cause telemetry module 16 to transmit a request for data that is to be used by one or more of the applications to one or more of servers 24 based on the trend data, which is based on the monitored application and contextual usage characteristics. Processor 10 then receives the requested data from one or more of servers 24. In some examples, application request manager 9 may transmit the request for the data and receive the data prior to user 22 accessing the one or more applications. The trend data indicates the behavior pattern of user 22, and may indicate when user 22 accesses a particular application.

Application request manager 9 may determine when a request for data should be transmitted to one or more servers 24 for the applications executed by processor 10. In some examples, some of the applications executed by processor 10 may automatically transmit a request for data from one or more servers 24 based on a preprogrammed schedule, e.g., every hour, every three hours, etc. In some examples, the applications executed by processor 10 may transmit a request for data based on interaction by user 22. In either examples, the applications executed by processor 10 transmit the request; however, the request may be initiated by user 22 or may be initiated automatically by the applications based on a preprogrammed schedule.

When application request manager 9 receives a request for data from an application for data that is to be retrieved from one or more servers 24, application request manager 9 may identify whether the request is initiated from user 22 or initiated from an application, based on a preprogrammed schedule without intervention from user 22. In some examples, when a request for data is transmitted by the application, processor 10 may transmit a signal to application request manager 9 that indicates that a request for data is transmitted by an application and whether the request is initiated by user 22 or by the application based on the preprogrammed schedule of the application. As one example, processor 10 may determine that user 22 initiated a request for data from one or more servers 24 based on the interaction of user 22 with display 18 and/or user interface 20. As one example, processor 10 may determine that an application automatically initiated a request for data from one or more servers 24 based on the preprogrammed schedule for that application.

If the request for data is initiated by user 22, application request manager 9 may cause telemetry module 16 to transmit a request for the data. Application request manager 9 may be configured to always transmit the request for the data, if the request for data is initiated by user 22.

If the request for data from one or more servers 24 is initiated by an application, application request manager 9 may determine whether the request should be transmitted to one or more servers 24 based on the trend data stored in storage device 12. For example, if the request, initiated by an application, requested for data from one or more servers 24 at 1:00 pm, application request manager 9 may determine whether the trend data for that application indicates that data should be requested at 1:00 pm. As another example, if the request, initiated by an application, requested for data from one or more servers 24 while user 22 is walking, application request manager 9 may determine whether the trend data for that application indicates that data should be requested while user 22 is walking.

If the trend data indicates that data should be requested for that application, application request manager 9 may cause telemetry module 16 to transmit a request for the data to one or more servers 24. If the trend data indicates that data should not be requested for that application, in one example, application request manager 9 may store the request for data. Application request manager 9 may store the request in an internal cache, an external cache, in storage device 12, or in memory dedicated for such storage in storage device 12.

Application request manager 9 may transmit the request, currently stored, to one or more servers 24 based on the trend data. For example, assume that the trend data indicates that user 22 requests for stock information at 2:00 pm. Further assume that at 1:00 pm, the application to retrieve stock information initiates a request for the stock information. In this example, application request manager 9 receives the request for data, automatically initiated by the application, at 1:00 pm. Application request manager 9 may then determine whether the request should be transmitted based on the trend data. Since the trend data indicated that user 22 generally retrieves the stock information at 2:00 pm, application request manager 9 may store the request for data. Application request manager 9 may cause telemetry module 16 to transmit the stored request for the data from one or more servers 24 at time shortly before 2:00 pm, e.g., at 1:55 pm. In this manner, recently generated stock information is available for viewing by user 22 at 2:00 pm.

In some instances, after application request manager 9 receives a first request for data, initiated by an application, application request manager 9 may receive another, second request for data, automatically initiated by the application, before application request manager 9 caused telemetry module 16 to transmit the first request. For instance, in the previous example, application request manager 9 received a request for data, initiated by the application, for stock information at 1:00 pm. However, the trend data indicated that user 22, generally, does not retrieve stock information until 2 pm. In this example, application request manager 9 stored the request initiated at 1:00 pm. As one example, application request manager 9 may receive another request at 1:30 pm from the application for the stock information. In this example, application request manager 9 may delete or discard the 1:00 pm request and store the 1:30 pm request. Application request manager 9 may transmit the 1:30 pm request at 1:55 pm. Application request manager 9 may perform similar acts for any additional requests that are initiated by the application and occur before 2:00 pm.

When application request manager 9 receives a request for data, initiated by an application, and determines, based on the trend data, that the request should not be transmitted, application request manager 9 may transmit a signal to processor 10 indicating that application request manager 9 did not transmit the request for data. In one example, the signal to processor 10 may indicate that there is loss of connection, even though there may not necessarily be such loss of connection. As another example, the signal to processor 10 may indicate that no data is available, even though there may be available data. In this manner, the application executing on processor 10 need not keep waiting to receive the requested data.

In some examples, based on the trend data, application request manager 9 may transmit a request for the data used by the particular application and receive the data before user 22 access that particular application. In some examples, application request manager 9 may initiate the transmission for the request for the data without intervention from user 22. For example, the trend data may indicate that user 22 tends to retrieve stock quotes for three stocks every day at 8:00 am except on Sunday. Application request manager 9 may transmit a request for the stock quotes for the three stocks every day at 7:58 am except on Sunday and receive the stock quotes for the three stocks at 7:59 am so that the stock quotes are freshly updated for user 22 prior to access by user 22 of, or display of data for, the application that retrieves the stock quotes. The stock quotes may be retrieved prior to access by user 22 of (or display of data for) the application because, based on the trend data, user 22 generally does not tend to request for the stock quotes until 8:00 am. Application request manager 9 may store the data received in response to the request in storage device 12 or in a cache memory (not shown) for quick access. By storing the data received in response to the request in storage device 12 or in a cache memory, the data may be available for access even if the connection speed is reduced or device 4 loses all connection to one or more servers 24.

As another example, the trend data may indicate that user 22 retrieves news after jogging. Application request manager 9 may transmit a request for the news while user 22 is jogging and may receive the news shortly before or while user 22 is jogging so that the news is freshly updated for user 22 prior to access by user 22 or, or display of data for, the application that retrieves the news.

The time when application request manager 9 may transmit a request for data used by an application may be a function of the application and may be different for different applications. Application request manager 9 may transmit the request for application data for applications that require very recent data a short time before user 22 generally requests the data. However, for applications that do not require very recent data, application request manager 9 may transmit the request at a much earlier time before user 22 generally requests the data. For example, stock quotes may be updated every minute on one of servers 24, and for applications on device 4 that retrieve stock quotes, application request manager 9 may transmit the request for the stock quotes one minute before user 22 generally requests the stock quotes to provide user 22 with the most recent data. As another example, the locations of restaurants does not change regularly, and thus for applications on device 4 that retrieve restaurant locations, application request manager 9 may transmit the request for the restaurant information ten minutes, or even a few hours, before user 22 generally requests the restaurant information.

In some examples, application request manager 9 may determine whether a request for data should be transmitted for an application when the application does not request data automatically. For example, an application to find local restaurants may not periodically transmit a request for data. However, the trend data may indicate that user 22 desires information about local restaurants every Friday at 6:00 pm, based upon prior requests initiated by the user. In this example, application request manager 9 may transmit a request for data for local restaurants at a time before 6:00 pm, e.g., 4:00 pm. Application request manager 9 may then store the received data in cache or storage device 12, as two examples. Then when the application requests for the local restaurant information, application request manager 9 may provide the stored data to the application. Accordingly, in some examples, application request manager 9 may determine whether the requested data is already stored and provide the stored data to the application when the request is initiated.

As described above, the trend data may indicate the activity of user 22, such as a pattern of which applications are executed and the context in which they are executed. However, in some scenarios, the trend data may indicate the inactivity of user 22. For example, the usage characteristics may indicate that between approximately 11:00 pm and 7:00 am and when user 22 is at home, device 4 is in sleep mode, an alarm is set for 7:00 am, and user 22 does not execute any applications. The trend data may indicate that user 22 does not execute any applications every day between 11:00 pm and 7:00 am, that the alarm is set for 7:00 am every day, and that device 4 is in sleep mode every day between 11:00 pm and 7:00 am at the particular location, e.g., the address of the home of user 22.

In these scenarios, application request manager 9 may not cause telemetry module 16 to transmit a request for data to one or more servers 24 between 11:00 pm and 7:00 am. However, in some examples, to provide recent data that user 22 may desire at 7:00 am, application request manager 9 may request processor 10 to cause device 4 to exit sleep mode, execute an application, transmit a request for data to be used by that application, receive the data, and then cause device 4 to enter sleep mode again. As another example, the usage characteristics may indicate that user 22 does not access e-mail between the time an alarm on device 4 is set and when the alarm goes off. The trend data may indicate that shortly after the alarm goes off, user 22 accesses e-mail via an e-mail application. In this example, application request manager 9 may not cause telemetry module 16 to transmit a request for any e-mails from the e-mail application between the time the alarm is set and shortly before the alarm is set to go off. Based on the trend data, application request manager 9 may transmit a request for the e-mails shortly before the alarm is set to go off so that the e-mails are waiting for user 22.

In some examples, when transmitting a request for data for one or more applications, application request manager 9 may account for the status of battery 14. Battery 14 provides power for all the various units of device 4, and may be rechargeable. Examples of battery 14 include a lithium polymer battery, a lithium ion battery, nickel cadmium battery, and a nickel metal hydride battery. If battery 14 is low on charge, to conserve the charge of battery 14, application request manager 9 may transmit a request for data for applications only if there is a relatively high correlation between application usage characteristics and the contextual usage characteristics, e.g., if the trend data indicates a very strong pattern.

The functions attributed to application request manager 9, in this disclosure, may be embodied as software, firmware, hardware or any combination thereof. Moreover, although shown as separate units in FIG. 1, in some examples, processor 10 may include application request manager 9. Furthermore, application request manager 9 is provided for illustration purposes only and may not be required in every example of device 9. The functions attributed to application request manager 9 may be performed by processor 10.

The techniques of this disclosure may be implemented as background processes that are continually occurring without knowledge to user 22. For example, the monitoring of application usage characteristics and contextual usage characteristics may occur as background processes. Similarly, the association of the monitored application and contextual usage characteristics to generate the application usage model, the generation of trend data based on the application usage model, and the transmitting the request for data may also occur as background processes. User 22 may be unaware of the monitoring, the transmitting of requests for data, and the receiving of data performed based on the monitoring. Accordingly, in some examples, application usage monitor 8 and contextual usage monitor 6 may perform their respective functions without intervention from user 22. In some examples, processor 10 may perform certain functions such as association of application usage characteristics and contextual usage characteristics and generation of trend data without intervention from user 22.

In some examples, the monitoring of application usage characteristics and contextual usage characteristics may be performed with the knowledge of user 22. For example, user 22 may be requested to allow the monitoring of application and contextual usage characteristics. User 22 may be provided information that the requests for the data may be transmitted prior to user 22 transmitting a request for the data based on the monitored application and contextual usage characteristics.

By monitoring application and contextual usage characteristics of each application, transmitting a request for data to be used by an application, and receiving data for an application based on the monitoring, device 4 may receive recently generated data for that application from one or more of servers 24 without needing to receive the data constantly and at times when the data is not going to be utilized. For example, in various aspects of this disclosure, application request manager 9 need not transmit a request for data only based on a fixed schedule, e.g., every hour or every four hours. Rather, application request manager 9 may transmit requests for data as needed based on the application and contextual usage characteristics.

Constantly retrieving the data or transmitting a request for the data and receiving the data at times when the data is not going to be utilized may drain battery 14. Moreover, there may be limited bandwidth and unreliable connections to allow device 4 to transmit requests for data and retrieve the data when the data is not going to be utilized. Furthermore, user 22 may be charged based on his or her bandwidth consumption. By monitoring application and contextual usage characteristics of each application, transmitting a request for application data based on the monitoring shortly before subsequent data access/display, as indicated by the trend data, device 4 may still receive recently generated data, the life of battery 14 may be potentially extended, and the costs to user 22 may be reduced due to fewer times that device 4 receives data. Furthermore, in some examples, costs to user 22 may be further reduced by transmitting requests during evening and weekends, if the data plan for user 22 includes free evening and weekends. Costs to user 22 may also be reduced by transmitting requests utilizing low cost options such as WiFi.

Figure 2:
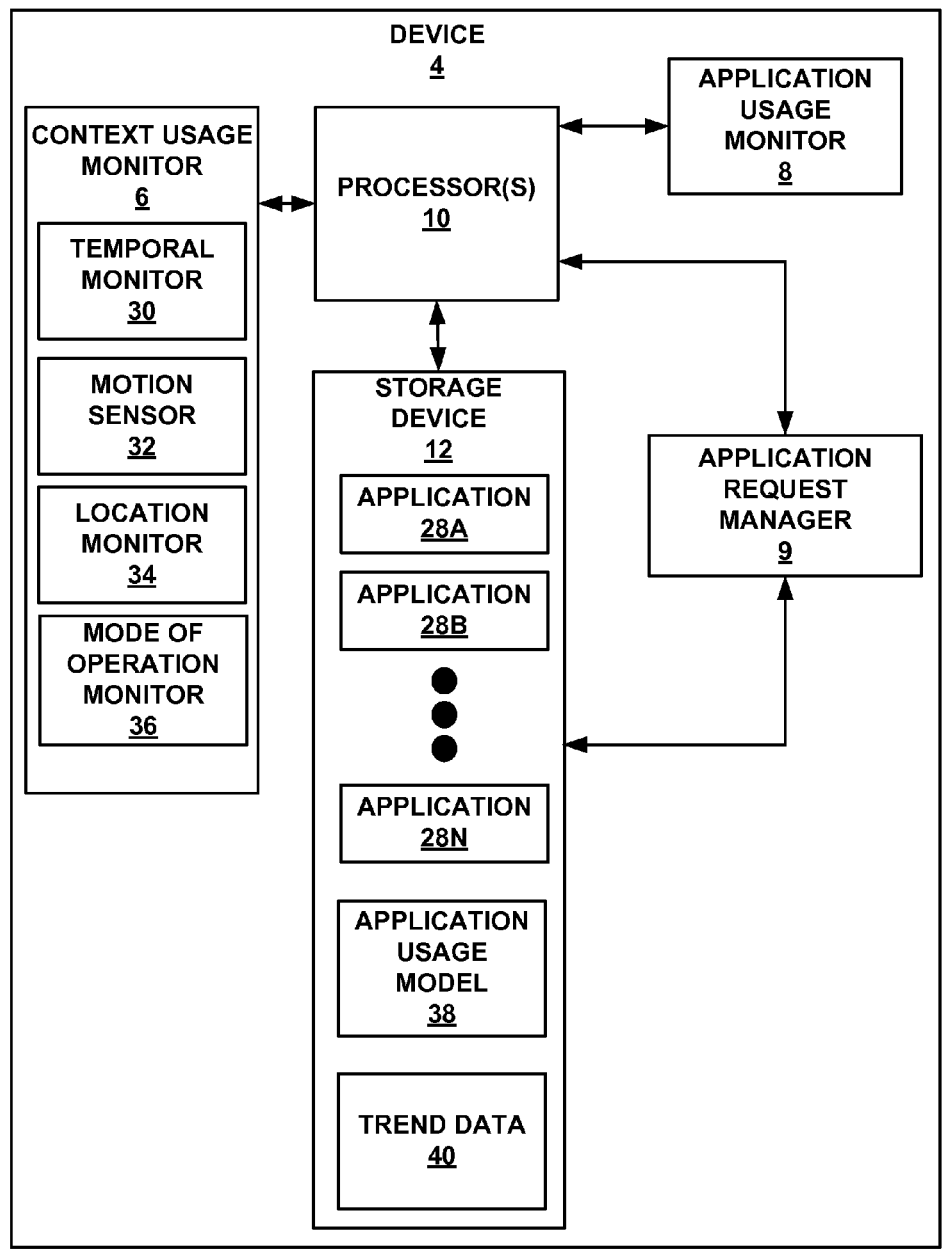
FIG. 2 is a block diagram illustrating an example device of the communication system that may transmit a request for data for one or more applications to one or more servers, in accordance with one aspect.

FIG. 2 is a block diagram illustrating an example device of the communication system that may transmit a request for data for one or more applications to one or more servers, in accordance with one aspect. For purposes of clarity, various units of device 4 shown in FIG. 1 are not shown in FIG. 2. As shown in FIG. 2, storage device 12 includes application 28A-28N ("applications 28"). Processor 10 may execute one or more of applications 28 either alone or simultaneously. Examples of applications 28 include web browsers, e-mail, programs to retrieve stock quotes, programs to search for restaurants, programs that retrieve current and future weather information, games, a program to search the Internet, a program that provides news, a program that provides maps, and other programs executed by processor 10. Applications 28 may be executed based on a request from user 22, and may be terminated based on a request from user 22. Some applications 28 may be running continuously in the background. Some applications 28 may be executed automatically by device 4 such as at power up and may be terminated automatically by device 4 such as at power down.

Context usage monitor 6 may include temporal monitor 30, motion sensor 32, and location monitor 34, and mode of operation monitor 36, as a few examples. Temporal monitor 28 may comprise a clock and may provide temporal information such as date, time of day, and day of week. In some examples, the temporal data may also include the status of user 22. For example, user 22 may program a calendar provided by device 4 to indicate times when user 22 is free or busy. The temporal data may also include times when user 22 is free or busy, as one example. Motion sensor 30 may comprise an accelerometer and may indicate whether user 22 is moving such as walking, running, going at driving speeds, as well as, not moving. Location monitor 32 may monitor the location of device 4 based on data stored either locally to device 4 or provided by an external device (e.g., one or more of servers 24 or external satellites). For example, location monitor 32 may function similar to a GPS unit. In some examples, the location data may be limited to recognizing when device 4 is in a familiar location, and if not in a familiar location, may consider the location to be unfamiliar. Mode of operation monitor 36 may monitor the mode of operation of device 4, such as whether device 4 has connectivity such as Wi-Fi connectivity, EDGE connectivity, or 3G connectivity, whether an alarm is set, whether device 4 is in sleep mode, whether display 18 is turned off, and whether the brightness of display 18 is reduced. Context usage monitor 6 may include fewer or more monitors, and aspects of this disclosure should not be considered limited to the monitors shown in context usage monitor 6. In some examples, context usage monitor 6 may monitor the order in which one or more applications 28 is executed.

For each execution of one or more applications 28, processor 10 may retrieve the contextual usage characteristics from one or more of temporal monitor 30, motion sensor 32, location monitor 34, and mode of operation monitor 36. Processor 10 may associate the application usage characteristics monitored by application usage monitor 8 and the contextual usage characteristics monitored by one or more of temporal monitor 30, motion sensor 32, location monitor 34, and mode of operation monitor 36. The association of application usage characteristics and contextual usage characteristics may generate application usage model 38. Processor 10 may store application usage model 38 in non-volatile portions of storage device 12 (e.g., as a log or within a database).

In some examples, processor 10 may access the application usage model 38 stored in storage device 12 and analyze application usage model 38. Processor 10 may analyze application usage model 38 to identify behavior patterns of user 22. For example, processor 10 may identify a pattern of the manner in which the user has utilized each one of applications 28 and a pattern of the context in which the user has utilized each one of applications 28.

Based on the analysis, in some examples, processor 10 may generate trend data 40 that indicates the pattern of behavior of user 22. For example, if user 22 operates one or more of applications 28 in a substantially similar manner in similar settings repeatedly, trend data 40 may indicate strong pattern between the application usage characteristics of that one of applications 28 and its contextual usage characteristics.

Trend data 40 may indicate the usage characteristic patterns of user 22. In some examples, trend data 40, which is based on the usage characteristics, allows application request manager 9 to transmit a request for data (e.g., from one or more of servers 24) to be used by one or more applications 28 prior to subsequent access by user 22 of, or display of data by, the one or more applications 28, because trend data 40 may indicate when user 22 typically accesses data for these applications. In this manner, device 4 need not continuously retrieve data for the one or more applications, and may retrieve application data only when the data will typically be utilized. For example, some time before the data will be utilized or displayed to user 22, as indicated by trend data 40, application request manager 9 may transmit a request for the data. Processor 10 may receive the data for processing by one or more of applications 28.

Application request manager 9 may determine whether a request for data is initiated by user 22 or by one or more of applications 28. If the request is initiated by user 22, application request manager 9 may transmit the request for the data. Application request manager 9 may determine whether a request for data is initiated by user 22 or by one or more applications 28 based on the signal that application request manager 9 receives from processor 10. Processor 10 may determine whether the user 22 initiated a request for data based on the interaction of user 22 with display 18 and/or user interface 20.

In some examples, one or more applications 28 may automatically transmit requests for data based on a preprogrammed schedule. Processor 10 may transmit the request to application request manager 9 and indicate that the request is automatically initiated by an application based on the preprogrammed schedule, and without intervention from user 22. Upon receiving the request for data, initiated by the one or more applications 28, application request manager 9 may determine whether the request should be transmitted based on trend data 40. If trend data 40 indicates that request should be transmitted, application request manager 9 may transmit the request by causing telemetry module 16 to transmit the request to one or more servers 24. Trend data 40 may indicate that the request should be transmitted because the behavior pattern of user 22 may indicate that user 22 requests the data when the one or more applications 28 initiated the request.

If trend data 40 indicates that the request may not need to be transmitted because the behavioral pattern of user 22 indicates that user 22 may not request the data when the one or more applications 28 requested the data, application request manager 9 may store the request, and provide an indication to processor 10 that application request manager 9 did not transmit the request. For example, application request manager 9 may transmit a signal to processor 10 that indicates that there is no connection, when a connection may be available, that there are no new data, when new data may be available, or that the application should not update the data. In this manner, processor 10 may recognize that application request manager 9 did not transmit the request. In some examples, application request manager 9 may not provide any signal back to processor 10. However, processor 10 may be configured to recognize that if application request manager 9 does not transmit back a signal, then application request manager 9 did not transmit a request for the data.

Application request manager 9 may act as a throttle for the requests for data, initiated by one or more applications 28. If the requested data may not need to be transmitted based on trend data 40, application request manager 9 may stop the request from being transmitted, e.g., throttle the request. In this manner, application request manager 9 may allow requests for data to be transmitted as needed, based on the trend data, rather than allow requests for data to be transmitted based on a preprogrammed schedule when the requested data may not be needed by user 22. In some instances, application request manager 9 may limit background requests such as requests for data initiated by one or more applications 28 based on the trend data. Application request manager 9 may always allow foreground requests for data such as requests for data initiated by user 22 to be transmitted. By throttling the requests, initiated by one or more applications 28, the life of battery 12 may be extended and the bandwidth consumption of device 4 may be reduced. Extending the life of battery 12 may allow user 22 to utilize device 4 for longer periods of time without needing to recharge battery 12. Reducing the bandwidth consumption of device 4 may lead to lower costs for user 22.

Application request manager 9 may determine when the stored request should be transmitted based on trend data 40. Trend data 40 indicates the pattern of when user 22 generally requests the data for one or more applications 28. Based on trend data 40, in some examples, application request manager 9 may transmit the stored request.

In some examples, application request manager 9 may transmit a request for data when one or more applications 28 did not initiate a request for data and when user 22 did not initiate a request for data. In other words, application request manager 9 may, in some cases, automatically initiate requests for data. In these examples, application request manager 9 may determine, based on trend data 40, when to transmit a request for data for an application. Application request manager 9 may then store the received data in cache or storage device 12. When one or more applications 28 desire the requested data, application request manager 9 may provide the requested data from cache or storage device 12 to processor 10.

Figure 3:
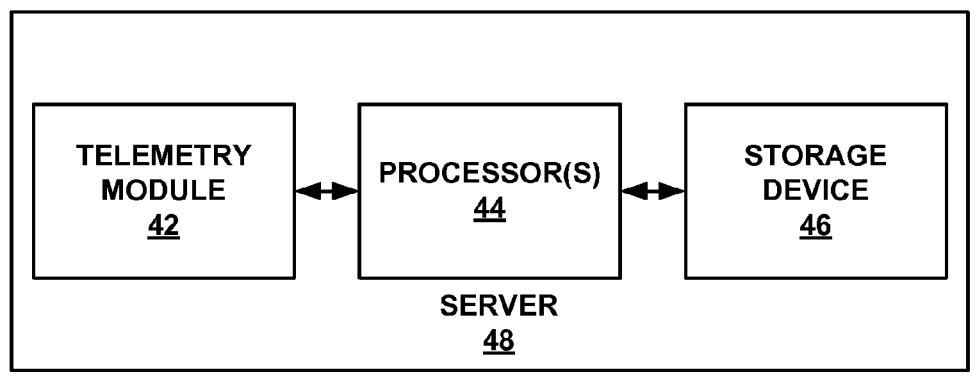
FIG. 3 is a block diagram illustrating an example server that may generate trend data, in accordance with one aspect.

FIG. 3 is a block diagram illustrating an example server that may generate trend data, in accordance with one aspect. Server 48 may be substantially similar to one of servers 24. In some instances, server 48 may be configured to receive the application usage model generated by device 4 and generate the trend data. In some instances, server 48 may not receive the application usage model, and may be configured to monitor the application usage characteristics and contextual usage characteristics to generate the trend data. In some instances, server 48 may receive the contextual usage characteristics monitored by device 4, monitor the application usage characteristics, and generate the trend data. Server 48 may include telemetry module 42, one or more processors 44, and storage device 46. Telemetry module 42 may be substantially similar to telemetry module 16 (FIG. 1). Processors 44 may be substantially similar to processors 10 (FIG. 1). Storage device 46 may be substantially similar to storage device 12 (FIG. 1). In some examples, storage device 46 may provide more storage capabilities compared to storage device 12.

Telemetry module 42, in some instances, may receive the request for data and the application usage model from device 4 and other devices similar to device 4. In some instances, telemetry module 42 may receive the application usage model for applications on a per event basis. For example, telemetry module 42 may receive the application usage characteristics and the contextual usage characteristics after each instance of an application being executed on device 4 and other devices similar to device 4. In some instances, telemetry module 42 may receive application usage model for applications after the applications have been executed on device 4 or other similar devices at least a few times, e.g., at least five times.

Telemetry module 42, in some instances, may receive the request for data, and may not receive the application usage model from device 4 and other devices similar to device 4. In some instances, telemetry module 42 may not receive the application usage model and the application usage characteristics, but may receive the request for data and the contextual usage characteristics associated with the requests for data.

Telemetry module 42 may also receive a unique identifier from device 4 and other similar devices to identify which device transmitted that the request for data. The unique identifier may ensure the privacy of user 22 and other users. Furthermore, in some examples, telemetry module 42 may receive the application usage model and/or the contextual usage characteristics after the application usage model and/or contextual usage characteristics are encoded, e.g., compressed. In such examples, telemetry module 42 may include a decoder to decompress the received application usage model and/or contextual usage characteristics. Moreover, to further ensure the privacy of user 22 and other users, telemetry module 42 may remove any information that may identify the users, such as the name of the users, the address of the users, the phone number of the users, etc. The unique identifier of the devices may be sufficient for one or more processors 44 to generate the trend data, and personal information about the users may not be needed.

In examples where telemetry module 42 receives the application usage model, one or more processors 44 may receive the application usage model from telemetry module 42, identify the application usage characteristics and the contextual usage characteristics, and identify patterns in user behavior. One or more processors 44 may then generate trend data based on the identified patterns. In some examples, one or more processors 44 may generate the trend data in a substantially similar manner as processor 10 of device 4.

In examples where telemetry module 42 receives the request for data, but does not receive the application usage model, one or more processors 44 may store the request for data in storage device 46 and identify a time when the request for data is received for each instance of the data request. Based on the request for data, one or more processors 44 may monitor, e.g., identify, the application usage characteristics to identify the data requested, (e.g., monitor the manner in which user 22 utilizes one or more applications 28 for which the data is requested). Based on the when the request for data is received, one or more processors 44 may identify the contextual usage characteristics. One or more processors 44 may associate the monitored application usage characteristics and the contextual usage characteristics to generate the application usage model, and identify patterns in user behavior. One or more processors 44 may then generate trend data based on the identified patterns. One or more processors 44 may store the generated application usage model in storage device 46.

In examples where telemetry module 42 receives the request for data and the contextual usage characteristics, but does not receive the application usage model and the application usage characteristics, one or more processors 44 may identify the received contextual usage characteristics and store the request for data and the contextual usage characteristics in storage device 46. Based on the request for data, one or more processors 44 may monitor, e.g., identify, the application usage characteristics, (e.g., monitor the manner in which user 22 utilizes one or more applications 28 for which the data is requested). One or more processors 44 may associate the monitored application usage characteristics with the received, identified contextual usage characteristics to generate the application usage model, and identify pattern in user behavior. One or more processors 44 may then generate trend data based on the identified patterns. One or more processors 44 may store the generated application usage model in storage device 46.

Upon generating the trend data, one or more processors 44 may store the trend data in storage device 46. One or more processors 44 may associate the unique identifier of device 4 or other similar devices with the trend data generated for that device. In this manner, one or more processors 44 may determine which devices should receive which generate trend data. Furthermore, upon generating the trend data, one or more processors 44 may cause telemetry module 42 to transmit the generated trend data to their respective devices based on their respective unique identifiers.

In some examples, one or more processors 44 may perform functions similar to the functions of application request manager 9. Based on the generated trend data, one or more processors 44 may determine when data should be transmitted to device 4. For example, one or more processors 44 may identify when a device, e.g., device 4, generally transmits a request for data based on the trend data stored in storage device 46. In some examples, one or more processors 44 may cause telemetry module 42 to transmit the data that is generally requested, as identified by the trend data, before device 4 generally transmits a request for the data. Device 4 may store the retrieved data. In this manner, device 4 may not need to transmit a request for the data because the data is already available. Accordingly, in some examples, server 48 may transmit data to device 4 or other similar device prior to receiving a request for the data based on the trend data.

FIG. 4A is a diagram illustrating an example of an application usage model, in accordance with one aspect. Application usage model 50 may be substantially similar to application usage model 38 (FIG. 2). Application usage model 50 includes the application usage characteristics monitored by application usage monitor 8, and the contextual usage characteristics monitored by context usage monitor 6, for applications 28A and 28B in this particular example (though, in general, application usage model 50 may include such information for any/all of applications 28).

As one example, application 28A may be an application to retrieve stock quotes, and application 28B may be an application to retrieve restaurant location. In application usage model 50, at a first instance, the application usage characteristic indicates that user 22 executed application 28A to retrieve the stock quote for Google. The contextual usage characteristic, associated with the first instance, indicates that user 22 executed application 28A on Monday at 8:00 am from location 1. The determination of the day and time may be based on temporal monitor 30. Location 1 may be any location, such as a bus stop or the home of user 22. Location 1 may be based on information provided by location monitor 34.

In a second instance, subsequent to the first instance, the application usage characteristic indicates that user 22 executed application 28A to retrieve the stock quote for Google. The contextual usage characteristic, associated with the second instance, indicates that user 22 executed application 28A on Tuesday at 8:05 am from location 1. In a third instance, subsequent to the first and second instances, the application usage characteristic indicates that user 22 executed application 28A to retrieve the stock quote for Google. The contextual usage characteristic, associated with the third instance, indicates that user 22 executed application 28A on Wednesday at 8:02 am from location 1.

In application usage model 50, at a first instance, the application usage characteristic indicates that user 22 executed application 28B to retrieve restaurant information. The contextual usage characteristic, associated with the first instance, indicates that user 22 executed application 28B at location 2 while not moving. Like location 1, location 2 may be any location. Location 2 may be based on the location monitor 34. The indication that user 22 is not moving may be based on motion monitor 34.

In a second instance, subsequent to the first instance, the application usage characteristic indicates that user 22 executed application 28B to retrieve restaurant information. The contextual usage characteristic, associated with the second instance, indicates that user 22 executed application 28B at location 2 while not moving. In a third instance, subsequent to the first and second instances, the application usage characteristic indicates that user 22 executed application 28B to retrieve restaurant information. The contextual usage characteristic, associated with the third instance, indicates that user 22 executed application 28B at location 2 while not moving.

FIG. 4B is a diagram illustrating an example of trend data, in accordance with one aspect. In some examples, processor 10 may analyze application usage model 50 to identify patterns in the usage characteristics, e.g., pattern in the application usage characteristics and the contextual usage characteristics. In some examples, one of servers 24 may analyze application usage model 50 to identify patterns in the usage characteristics. For purposes of illustration, the following description describes that processor 10 analyzes application usage model 50 to identify patterns in the usage characteristics.

Processor 10 may identify a pattern that user 22 executes application 28A to retrieve the stock quotes for Google. Processor 10 may also identify a pattern that user 22 requests for this information every Monday, Tuesday, and Wednesday when located at location 1 and the time is approximately 8:00 am. Trend data 52 may include this identified pattern.

Processor 10 may identify a pattern that user 22 executes application 28B to retrieve restaurant information. Processor 10 may also identify a pattern that user 22 requests for this information every time user 22 is at location 2 and is not moving. Trend data 52 may include this identified pattern.

Figure 5:
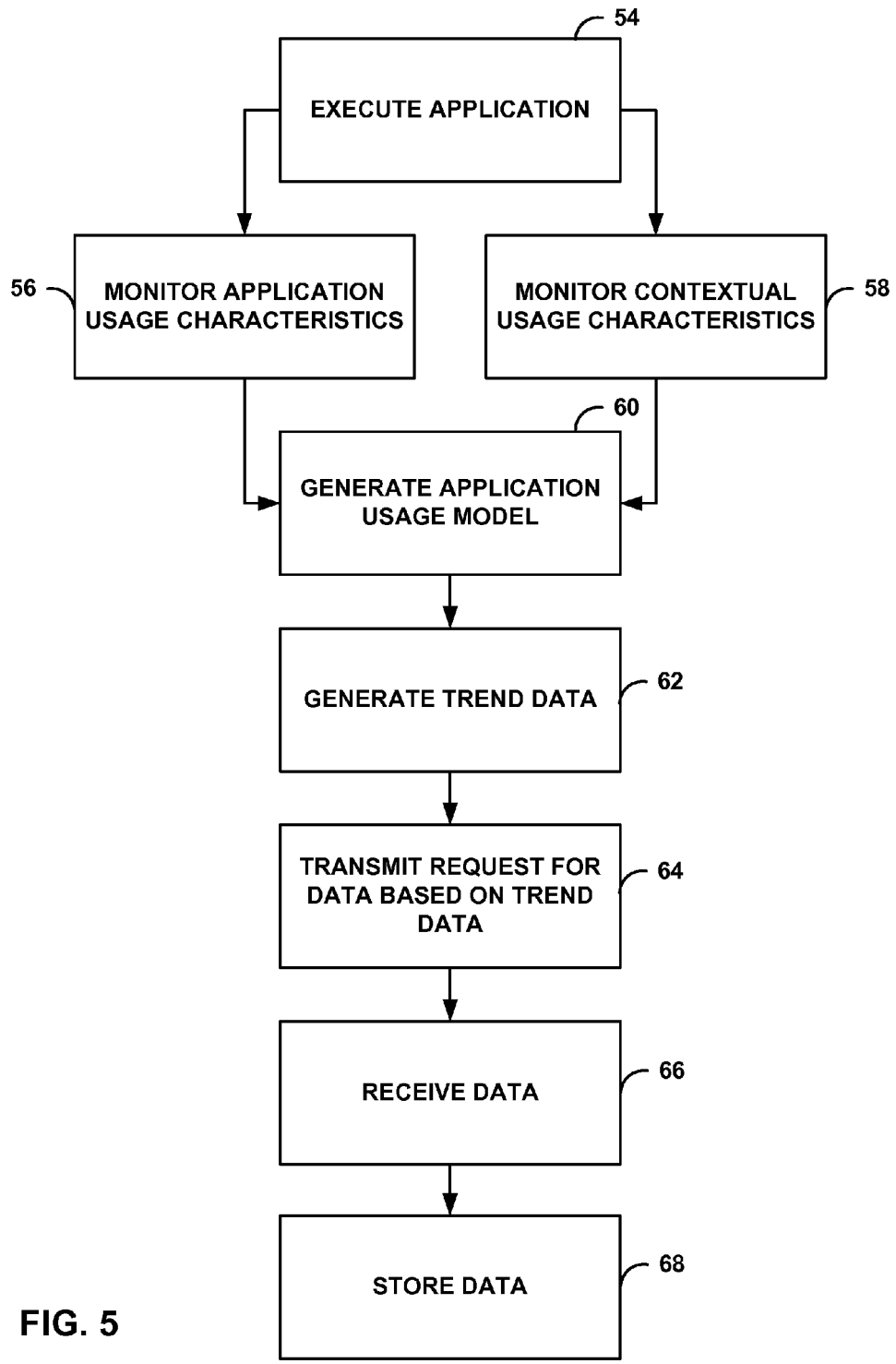
FIG. 5 is a flow chart illustrating an example method to request data for one or more applications from one or more servers, in accordance with one aspect.

FIG. 5 is a flow chart illustrating an example method to request data for one or more applications from one or more servers, in accordance with one aspect. For purposes of illustration only, reference is made to FIGS. 1 and 2. One or more applications (e.g., one or more of applications 28) may be executed (54). Upon execution of the one or more applications, the application usage characteristics may be monitored for each one of the one or more applications (56). The application usage characteristics may include the manner in which a user (e.g., user 22) utilized the application. For example, if the application is an application to retrieve restaurant information, the application usage characteristics may include the types of restaurants that the user requested.

Upon execution of the one or more applications, the contextual usage characteristics may be monitored (58). The contextual usage characteristics may be monitored in parallel with the application usage characteristics being monitored. The contextual usage characteristics may include the setting or context in which the one or more applications are executed. The contextual usage characteristics may also include the order in which one or more applications 28 is executed. For example, whether application 28D is executed after application 28N.

An application usage model (e.g., application usage model 38) may be generated based on the monitored application usage characteristics and the monitored contextual usage characteristics (60). The application usage model may be based on the association of the monitored application usage characteristics for each one of the one or more applications and the monitored contextual usage characteristics. The application usage model may be stored (e.g., as a log or within a database) in non-volatile portions of storage device 12.

Trend data (e.g., trend data 40) may be generated based on the application usage model (62). The trend data may indicate a pattern of behavior for the user. For example, the trend data may indicate a pattern of how each one of the one or more applications is used by the user and the context in which each one of the one or more applications is used by the user. The trend data may be generated by a processor (e.g., processor 10) or by a server (e.g., one of servers 24).

A request for application data that is used by the one or more applications may be transmitted based on the trend data (64). In response, the application data that is used by the one or more application may be received (66). The received data may be stored (68).

Figure 6:
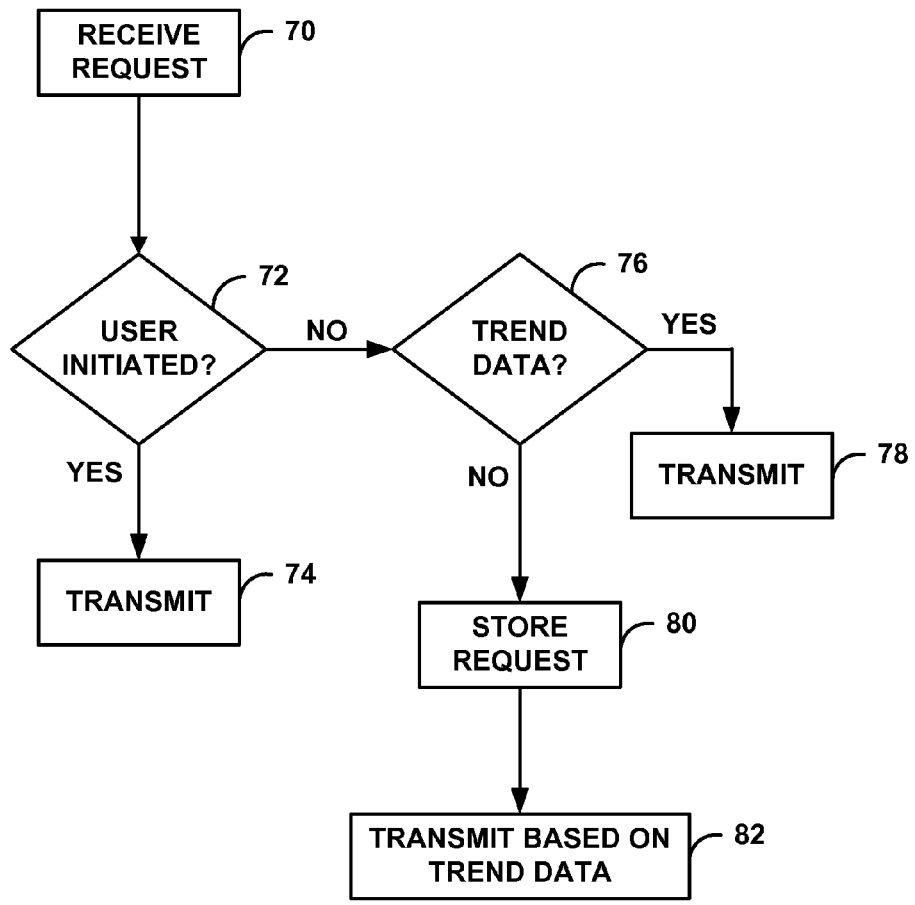
FIG. 6 is a flow chart illustrating an example method to transmit a request for data, in accordance with one aspect.

FIG. 6 is a flow chart illustrating an example method to transmit a request for data, in accordance with one aspect. For purposes of illustration and clarity, reference is made to FIGS. 1 and 2. A request for data may be received (70). A determination may be made as to whether the request for data is initiated by a user (e.g., user 22) or one or more applications (e.g., one or more applications 28) (72). If the request for data is initiated by the user (YES branch of 72), the request may be transmitted (74). If the request for data is initiated by one or more applications 28 automatically (NO branch of 72), a determination may be made whether the request should be transmitted based on the trend data (76). If the trend data indicates that the request for data should be transmitted (YES branch of 76), the request for data may be transmitted (78). If the trend data indicates that the request for data need not be transmitted at this time (NO branch of 76), the request for data may be stored (80). The request for the data may be transmitted based on the trend data (82).

Figure 7:
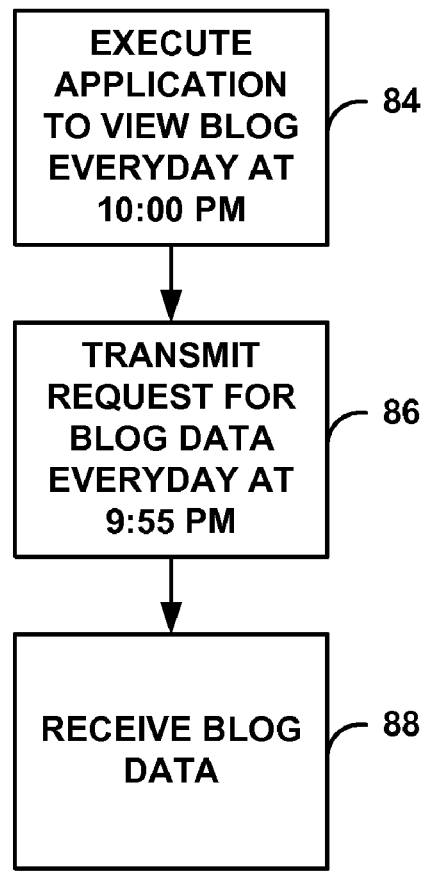
FIG. 7 is a flow chart illustrating an example method to transmit a request for data and to receive data for an application to view a blog, in accordance with one aspect.

FIG. 7 is a flow chart illustrating an example method to transmit a request for data and to receive data for an application to view a blog, in accordance with one aspect. For purposes of illustration and clarity, reference is made to FIGS. 1 and 2. In this particular example, in response to a request from user 22, processor 10 may execute an application to view a particular blog. User 22 request to view the particular blog at 10:00 pm. In this particular example, the application usage characteristics may indicate that user 22 executed an application to view the particular blog. The contextual usage characteristics may indicate that user 22 executes the application at approximately 10:00 pm. Processor 10 may associate the application usage characteristics and the contextual usage characteristics for each instance that user 22 executed the application to view the blog to generate the application usage model.

In one example, processor 10 may analyze the application usage model to identify trends in the behavior of user 22. From the analysis, processor 10 may identify that user 22 requests to view the blog every day at approximately 10:00 pm. The analysis may indicate trend data that identifies the behavioral pattern of user 22.

In another example, processor 10 may transmit the application usage model to server 48. Telemetry module 42 may receive the application usage model and provide the application usage model to one or more processors 44. One or more processors 44 may analyze the application usage model to identify trends in the behavior of user 22. From the analysis, one or more processors 44 may identify that user 22 requests to view the blog every day at approximately 10:00 pm. The analysis may indicate trend data that identifies the behavioral pattern of user 22. One or more processors 44 may store the trend data in storage device 46 and may cause telemetry module 42 to transmit the trend data to device 4.

Trend data (e.g., trend data 40) may indicate that a user (e.g., user 22) executes an application to view a blog everyday at approximately 10:00 pm (84). A determination of when data should be requested for the application to view a blog may be made based on the trend data. For example, the determination may be made that the data should be presented to the user five minutes before the user generally requests for the data because blog data may not be updated that often.

A request for the blog data may be transmitted everyday prior to 10:00, e.g., at 9:55 pm (86). The blog data may be received prior to 10:00 pm for presentment/display when user 22 executes or utilizes the application to view the blog (88).

Figure 8:
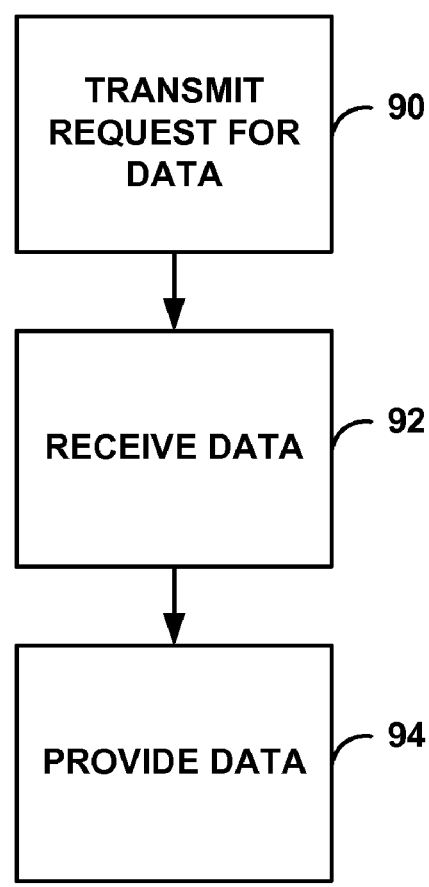
FIG. 8 is a flow chart illustrating an example method to transmit and receive data, in accordance with one aspect.

FIG. 8 is a flow chart illustrating an example method to transmit and receive data, in accordance with one aspect. For purposes of illustration and clarity, reference is made to FIG. 1. Based on instructions from a processor (e.g., processor 10), a request for data may be transmitted (e.g., by telemetry module 16) to one or more servers (e.g., one or more of servers 24) (90). For example, the application usage characteristics and the contextual usage characteristics may be monitored for each one of the one or more applications that are executed. The application usage characteristics and the contextual usage characteristics may be associated to generate an application usage model for each one of the one or more applications.

The application usage model may be analyzed. The analysis of the application usage model may indicate patterns of behavior of a user. Trend data may be generated based on the analysis of the application usage model. A determination may be made to transmit a request for data based on the trend data. For example, the trend data may indicate that the user generally requests for data at a certain time. The determination to transmit a request for the data may be made such that the request for the data is transmitted shortly before the time when the user generally requests the data. Accordingly, the transmission requesting the data may be made based on the trend data which is based on the monitored application and contextual usage characteristics.

In response to the request, the data may be received (e.g., by telemetry module 16) from the one or more servers (e.g., servers 24) (92). The data may be provided to the processor for further processing (94).

Figure 9:
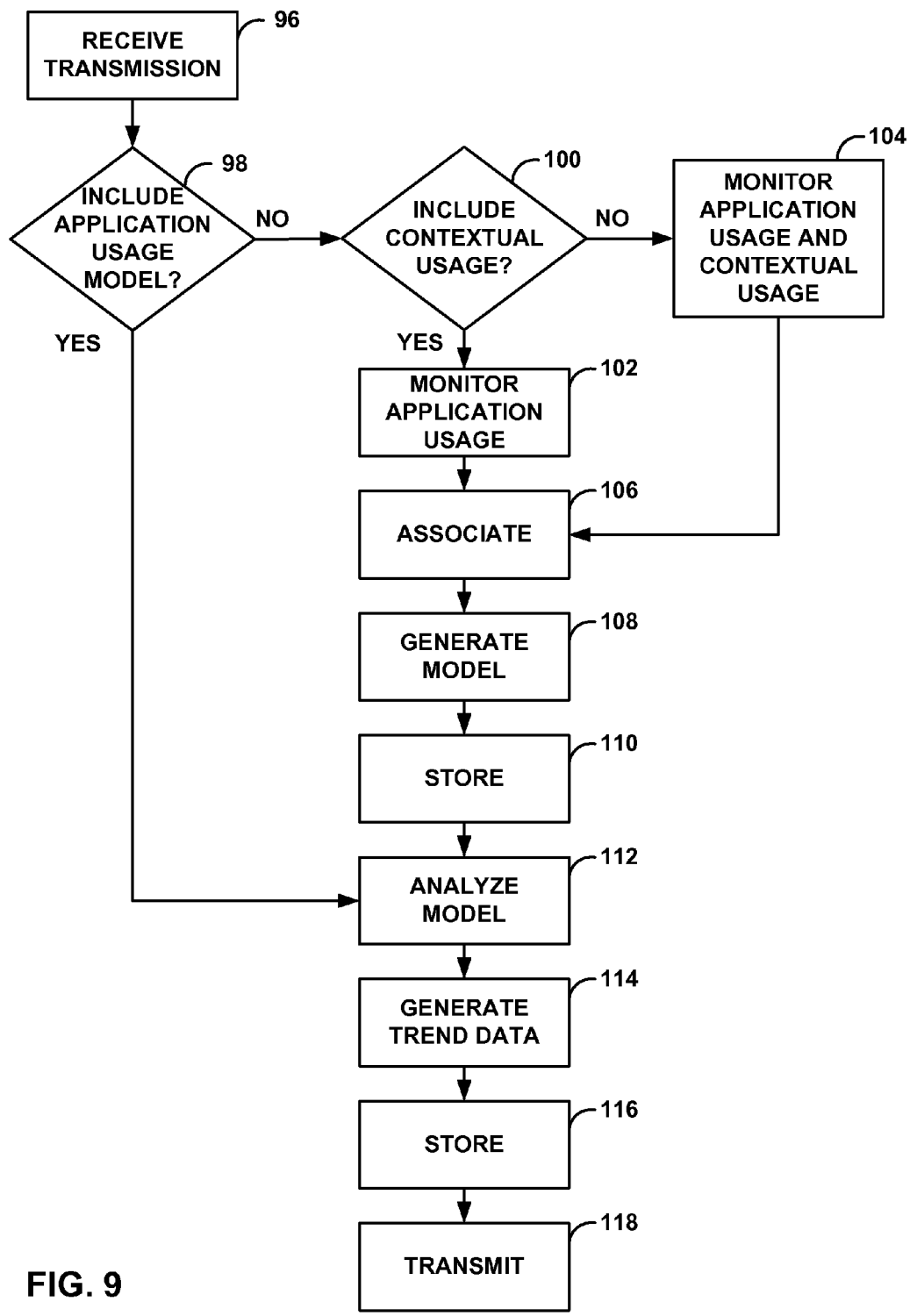
FIG. 9 is a flow chart illustrating an example method to generate trend data, in accordance with one aspect.

FIG. 9 is a flow chart illustrating an example method to generate trend data, in accordance with one aspect. For purposes of illustration and clarity, reference is made to FIGS. 1, 2, and 3. A transmission may be received (96). In one example, the transmission may be received by server 48. The transmission may include a request for data transmitted by device 4, as well, as a unique identifier that identifies that the transmission was transmitted by device 4.

A determination of whether the transmission includes an application usage model (98). If the transmission does not include an application usage model (NO branch of 98), a determination of whether the transmission includes contextual usage characteristics may be made (100).

If the transmission includes the contextual usage characteristics (YES branch of 100), the application usage characteristics may be monitored (102). For example, based on the request for data, the application usage characteristics may be monitored to identify the manner in which user 22 utilizes one or more applications 28 for which the data is requested.

If the transmission does not include the contextual usage characteristics (NO branch of 100), the application usage characteristics and the contextual usage characteristics may be monitored (104). For example, based on the time when the transmission is received or if the request includes a timestamp of when the transmission was transmitted, the contextual usage characteristics may be monitored.

In either instance, where the transmission includes the contextual usage characteristics or where the transmission does not include the contextual usage characteristics, the monitored application usage characteristics and contextual usage characteristics may be associated for each instance of the transmission (106). Based on the association, an application usage model may be generated based on each instance of the transmission (108). The application usage model may then be stored (110).

After the application usage model is stored, or when the transmission includes an application usage model (YES of branch 98), the application usage model may be analyzed (112). The application usage model may be analyzed to identify a pattern of behavior in the user. Based on the identified pattern of behavior, trend data may be generated (114). The trend data may be stored (116). The stored trend data may be transmitted to the devices (118). The trend data may be transmitted to the devices based on the unique identifier provided by the device during the transmission.

Conventional mobile devices may transmit requests for data at set intervals when the data may not always be needed, and receive the data, in response to the request, when the data may not always be needed. The batteries in conventional mobile devices may drain due to the constant transmission of requests for data and the reception of data when data may not necessarily be needed. Furthermore, conventional mobile devices may create added costs to the user by requiring the user to consume bandwidth when such consumption may not be needed or appropriate. One or more aspects of this present disclosure, such as one or more aspects described above, may include techniques for transmitting requests for application data based on the behavior pattern of the user, and for receiving the data in response to such requests. In this manner, data may be provided to user as needed and may limit the number of times that the device transmits requests for data and receives data, in response to the request. The reduction in the number of times the device transmits requests for data and receives data, in response to the request, may conserve battery power and reduce bandwidth consumption.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as RAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A computer-readable storage medium comprising instructions that, when executed, cause one or more processors to:
   monitor application and contextual usage characteristics of one or more applications executed on a device, wherein the application usage characteristics identify a manner in which a user utilized each of the one or more applications, and wherein the contextual usage characteristics identify a context in which the user utilized each of the one or more applications;
   determine, based at least in part on the monitored application and contextual usage characteristics, data to be used by the one or more applications; and
   prior to the one or more applications sending a request for the data, transmit, to one or more servers external to the device, the request for the data, wherein the transmittal of the request is initiated by the device without user intervention.

2. The computer-readable storage medium of claim 1, further comprising instructions to throttle transmission of the request, when subsequently initiated by the one or more applications, based on trend data compiled from the monitored application and contextual usage characteristics.

3. The computer-readable storage medium of claim 2,
   wherein the instructions to throttle transmission comprise instructions to determine whether to transmit the request for data, when the request for data is subsequently initiated by the one or more applications, based on the monitored application and contextual usage characteristics, and
   wherein the instructions to transmit the request for data comprise instructions to transmit the request for data based on the determination.

4. The computer-readable storage medium of claim 1, wherein the instructions to transmit the request for the data comprise instructions to transmit the request for the data prior to the one or more applications sending the request for the data and prior to subsequent user interaction with the device to request the data for the one or more applications.

5. The computer-readable storage medium of claim 4, wherein the instructions to transmit the request for the data prior to the one or more applications sending the request for the data and prior to subsequent user interaction comprises instructions to transmit the request for the data prior to subsequent user interaction to request the data during or by way of execution of the one or more applications or based on connectivity of the device indicated by the contextual usage characteristics.

6. The computer-readable storage medium of claim 1, wherein the instructions to transmit the request for the data comprises instructions to transmit the request for the data wirelessly to the one or more servers external to the device.

7. The computer-readable storage medium of claim 1, further comprising instructions that cause the one or more processors to:
   associate the monitored application and contextual usage characteristics to generate an application data model; and
   analyze the application data model to generate trend data based on the association,
   wherein the trend data identifies at least one pattern of the manner and context in which the user utilized each of the one or more applications, and
   wherein the instructions to transmit the request for the data comprises instructions to transmit the request for the data based on the trend data.

8. The computer-readable storage medium of claim 7, further comprising instructions that cause the one or more processors to:
   store the application data model in a storage device; and
   retrieve the application data model for analysis.

9. The computer-readable storage medium of claim 7, further comprising instructions that cause the one or more processors to:
   receive the request for data from one or more of the one or more applications;
   determine whether the request for data was initiated by the one or more applications;
   determine whether the request for data should be transmitted based on the trend data; and
   store the request for data when the trend data indicates that the request for data need not be transmitted to the one or more servers upon receipt of the request.

10. The computer-readable storage medium of claim 1, further comprising instructions that cause the one or more processors to:

in response to the request for the data, receive, from the one or more servers external to the device, the data to be used by the one or more applications.

11. The computer-readable storage medium of claim 10, wherein the instructions to receive comprise instructions to receive data used by at least two of the one or more applications at different times.

12. The computer-readable storage medium of claim 1, wherein the device is a mobile device.

13. A method comprising:
monitoring, by at least one of a device or one or more servers external to the device, application and contextual usage characteristics of one or more applications executed on the device, wherein the application usage characteristics identify a manner in which a user utilized each of the one or more applications, and wherein the contextual usage characteristics identify a context in which the user utilized each of the one or more applications;
determining, by the device, based at least in part on the monitored application and contextual usage characteristics, data to be used by the one or more applications; and
prior to the one or more applications sending a request for the data, transmitting, by the device, to the one or more servers external to the device, the request for the data, wherein the transmittal of the request is initiated by the device without user intervention.

14. The method of claim 13, further comprising throttling transmission of the request, when subsequently initiated by the one or more applications, based on trend data compiled from the monitored application and contextual usage characteristics.

15. The method of claim 14,
wherein throttling transmission comprises determining whether to transmit the request for data, when the request for data is subsequently initiated by the one or more applications, based on the monitored application and contextual usage characteristics, and
wherein transmitting the request for data comprises transmitting the request for data based on the determination.

16. The method of claim 13, wherein transmitting the request for the data comprises transmitting the request for the data prior to the one or more applications sending the request for the data and prior to subsequent user interaction with the device to request the data for the one or more applications.

17. A device comprising:
one or more processors configured to:
execute one or more applications on the device and to monitor application and contextual usage characteristics of one or more applications, wherein the application usage characteristics identify a manner in which a user utilized each of the one or more applications, and wherein the contextual usage characteristics identify a context in which the user utilized each of the one or more applications;
determine, based at least in part on the monitored application and contextual usage characteristics, data to be used by the one or more applications; and
prior to the one or more application sending a request for the data, transmit, to one or more servers external to the device, the request for the data, wherein the transmittal of the request is initiated by the device without user intervention.

18. The device of claim 17, wherein the one or more processors are further configured to throttle transmissions of the request, when subsequently initiated by the one or more applications, based on trend data compiled from the monitored application and contextual usage characteristics.

19. The device of claim 17, wherein the one or more processors are configured to transmit the request for the data prior to the one or more applications sending the request for the data and prior to subsequent user interaction with the device to request the data for the one or more applications.

20. The device of claim 17, wherein the one or more processors comprise:
a first processor configured to execute the one or more applications;
an application usage monitor configured to monitor the application usage characteristics, and
a context usage monitor configured to monitor the contextual usage characteristics.

* * * * *